United States Patent

Armbruster et al.

[11] Patent Number: 5,710,805
[45] Date of Patent: Jan. 20, 1998

[54] COMBINED REGISTRATION AND CALL CONTINUATION METHOD AND APPARATUS FOR A MOBILE COMMUNICATION SYSTEM

[75] Inventors: Peter Joseph Armbruster, Tempe; Kenneth Lee Sowles, Chandler; Daniel Richard Tayloe, Phoenix; James William Bishop, Jr., Chandler, all of Ariz.

[73] Assignee: Motorola, Inc., Schaumburg, Ill.

[21] Appl. No.: 552,964

[22] Filed: Nov. 3, 1995

[51] Int. Cl.$^6$ .................................................. H04Q 7/38
[52] U.S. Cl. ................................................ 379/59; 455/33.1
[58] Field of Search ............................. 379/59, 60, 58, 379/63; 455/33.1, 33.2, 12.1, 13.1, 54.1

[56] References Cited

U.S. PATENT DOCUMENTS

| | | | |
|---|---|---|---|
| 5,289,527 | 2/1994 | Tiedemann, Jr. | 379/59 |
| 5,400,392 | 3/1995 | Nagashima | 379/60 |
| 5,444,450 | 8/1995 | Olds | 379/60 |
| 5,519,706 | 5/1996 | Bantz | 455/56.1 |
| 5,552,795 | 9/1996 | Tayloe | 379/59 |
| 5,588,043 | 12/1996 | Tiedemann, Jr. | 379/63 |
| 5,600,706 | 2/1997 | Dunn | 379/60 |
| 5,612,703 | 3/1997 | Mallinckrodt | 379/59 |
| 5,617,100 | 4/1997 | Akiyoshi | 455/12.1 |
| 5,621,784 | 4/1997 | Tiedemann, Jr. | 455/33.1 |

*Primary Examiner*—Dwayne Bost
*Assistant Examiner*—Brian Johnson
*Attorney, Agent, or Firm*—Sherry J. Whitney

[57] ABSTRACT

In a communication system (10) which includes a communication unit (56) (CU), a Mobile-Switch Interface (50) (MSI), and a Mobile services Switching Center (40) (MSC), a method for location registration and call continuation involves the MSI (50) determining (174) whether the CU (56) intends to utilize a system service after the CU (56) completes a location updating process without releasing a channel between the CU (56) and the MSC (40). When the CU (56) does intend to utilize the system service directly after the location updating process, the MSI (50) allows the CU (56) to utilize the system service regardless of whether the MSC (40) indicated that the CU (56) cannot utilize the system service without first releasing the channel.

20 Claims, 6 Drawing Sheets

COMBINED REGISTRATION AND CALL CONTINUATION METHOD AND APPARATUS FOR A MOBILE COMMUNICATION SYSTEM

FIELD OF THE INVENTION

This invention relates generally to location registration in a GSM communication system, and more specifically to call continuation after location registration in a GSM communication system.

BACKGROUND OF THE INVENTION

The Global System for Mobile Communications (GSM) is a multiservice system which provides voice and data communications between mobile and fixed telecommunication stations. GSM has become the modem cellular communications system standard. GSM history and design is described in detail in MOULY & PAUTET, THE GSM SYSTEM FOR MOBILE COMMUNICATIONS (1992).

The GSM infrastructure includes a Base Station Subsystem (BSS) and a Mobile services Switching Center (MSC). An MSC is a point where communications transit between GSM and another network (e.g., a PSTN or other communication network). The BSS provides and manages transmission paths between Mobile Communication Units (MCU) and MSCs. MCUs can be, for example, vehicle-mounted, portable, or hand-held communication units.

Maintenance of MCU location data is important to GSM and to other mobile communication systems. As an MCU moves, the service provided to the MCU can change because of radio propagation (e.g., the MCU moves out of a coverage area), geographical limitations on the MCU's subscription, or because the MCU is served by different networks which provide different services. In addition, to avoid wasting signaling, the system must be able to route calls toward the MCU.

Each MSC covers one or more "location areas", which are areas on the surface of the earth having known boundaries. Desirably, an MCU is paged only in the cells of one location area when an incoming call arrives. Thus, some minimum information concerning the location of the MCU is necessary. To inform the network of the MCU's location so that the MCU can receive calls, the MCU must register with an MSC which covers the location area which the MCU is located within. The MCU informs the MSC of the location area in which the MCU should be paged using a location updating procedure. The MSC then stores the present location of the MCU.

The MCU-MSC location updating procedure consists of a request (i.e., a "LOCATION UPDATING REQUEST" message) from the MCU and an answer (i.e., a "LOCATION UPDATING ACCEPT" message or a "LOCATION UPDATING REJECT" message) from the MSC. Before the MSC gives an answer to the MCU, the MSC may perform authentication or ciphering setting actions.

The LOCATION UPDATING REQUEST message contains information necessary to identify the MCU. The LOCATION UPDATING ACCEPT message indicates that the MCU is successfully registered in the new location area as required. The LOCATION UPDATING REJECT message indicates that the MCU is not entitled to use system services in the new location area.

A location updating procedure can be initiated intentionally by the MCU user, or can be initiated automatically when the MCU user attempts to originate a call in a new location area. In the latter situation, a link between the MCU and the MSC is established and the location updating procedure is performed. Under the specifications of the GSM phase one design, as soon as the location updating procedure is completed, the MCU is forced to release the link. The MCU user is then required to re-originate the call. The necessity of re-origination after registration is inconvenient to the MCU user and is, thus, undesirable.

The GSM phase two design specifications enable an MCU user to follow resignation with a mobile origination without releasing the link. The feature is realized by allocating a bit in the LOCATION UPDATING REQUEST message called a "Follow-On Proceed" bit (FOP). When the FOP bit is set, the MCU will not be forced to release the link following a registration process. The call origination will be performed with no further action from the MCU user.

Although the follow-on proceed capability is desirable, its implementation requires the MSC to recognize the FOP bit and not to force the MCU to release the link when the FOP bit is set. Unfortunately, some existing equipment does not support the follow-on proceed capability and the costs associated with redesigning some existing equipment may not justify the redesign.

What is needed is a method and apparatus for maintaining a channel after a registration process when an MCU user desires to perform additional transactions beyond the registration process. Specifically needed is a method and apparatus for supporting the follow-on proceed capability which is independent from the design of the MSC.

DETAILED DESCRIPTION OF THE DRAWINGS

The method and apparatus of the present invention provides the ability to maintain a channel after a registration process when an MCU user desires to perform additional transactions beyond the registration process. The method and apparatus of the present invention supports the follow-on proceed capability independently from the design of the MSC which is used in a communication system.

The method and apparatus of the present invention can be carried out in a terrestrial-based, satellite-based, or combined terrestrial and satellite-based communication system. In typical terrestrial-based cellular systems, a BSS provides an RF interface between mobile communication equipment and an MSC. In a satellite-based system, mobile communication equipment communicates with an MSC through one or more satellites, an Earth Terminal (ET), and an Earth Terminal Controller (ETC). The ET is a communication facility, typically ground-based, which interfaces with the satellites. The ETC is a facility, usually co-located with an MSC, which controls the ET and interfaces the ET with the MSC. The combination of the satellite, the ET and the ETC is functionally similar to the BSS of a terrestrial-based system. As used herein, the general term "Mobile-Switch Interface" (MSI) is intended to encompass both a BSS-like device and a satellite/ET/ETC. The MSC, ET, and ETC are described in detail in conjunction with FIGS. 1 and 2. A general MSI is described in more detail in conjunction with FIG. 3.

A preferred embodiment of the present invention is described in terms of a satellite-based system. It is to be understood, however, that the method and apparatus of the present invention is not intended to be limited to a satellite-based communication system, but also covers terrestrial-based communication systems and combinations of terrestrial and satellite-based communication systems.

Figure 1:
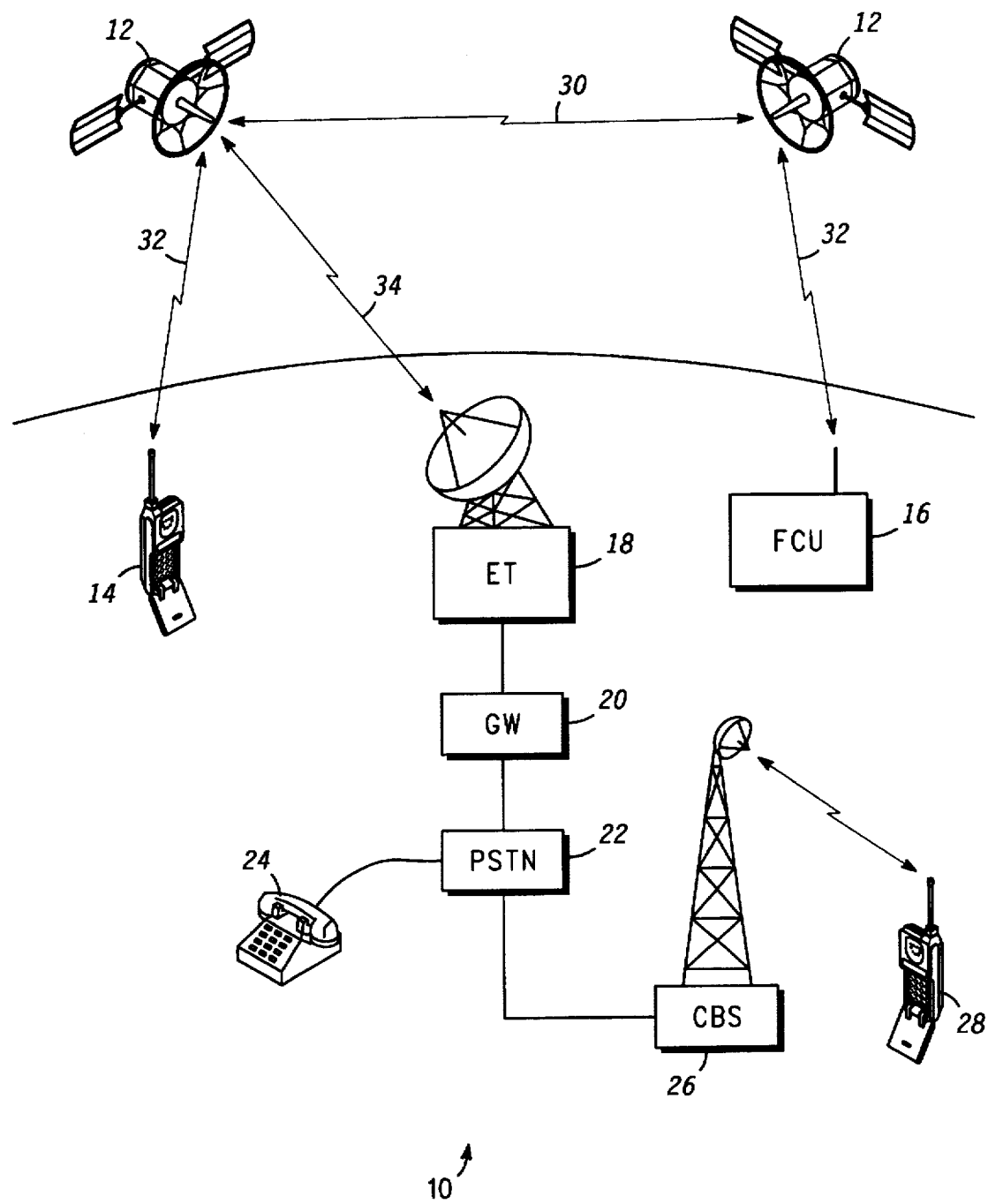
FIG. 1 illustrates a communication system in accordance with a preferred embodiment of the present invention.

FIG. 1 illustrates communication system 10 in accordance with a preferred embodiment of the present invention. In a preferred embodiment, communication system 10 includes satellites 12, Mobile Communication Unit 14 (MCU), Fixed Communication Unit 16 (FCU), Earth Terminal 18 (ET), Gateway 20 (GW), Public Switched Telephone Network 22 (PSTN), and conventional telephone 24. Communication system 10 can interface with Cellular Base Station 26 (CBS) which supports communication with cellular telephone 28.

As used herein, where both MCUs 14 and FCUs 16 perform the same functions, the general term Communication Unit (CU) will be used. MCU 14 can be, for example, a mobile cellular telephone or radio adapted to communicate with satellites 12 over radio-frequency (RF) link 32. MCU 14 can be, for example, a vehicle-mounted, portable, or hand-held communication unit. FCU 16 can be a stationary cellular telephone or radio adapted to communicate with satellites 12 over RF link 32. A CU is described in more detail in conjunction with FIG. 4.

Satellites 12 can be low-earth, medium-earth, or geostationary satellites. In a preferred embodiment, satellites 12 are low-earth orbit satellites which communicate with each other over cross-link 30. Thus, a call from a first CU 14, 16 that is serviced by a first satellite 12 can be routed directly through one or more satellites over cross-links 30 to a second CU 14, 16 serviced by a second satellite 12. Satellites 12 route speech and data packets received from CUs 12, 16, ET 18, and other communication devices (not shown). Satellites 12 communicate with ET 18 over link 34.

Satellites 12 communicate with ET 18 over link 34. ET 18 is a device which interfaces satellites 12 with ground based equipment. ET 18 is controlled by GW 20. In an alternate embodiment, where the communication system is terrestrially-based, ET 18 would function as a BSS and would directly communicate with CUs 14, 16.

GW 20 also provides an interface to terrestrial telephony apparatus, such as PSTN 22, which provides telephone service to conventional telephone 24. PSTN 22 also enables cellular telephone 28 to communicate with other CUs 14, 16 in communication system 10 through CBS 26. Cellular telephone 28 communicates with CBS 26 over link 36.

FIG. 1 illustrates only a few of CUs 14, 16, satellites 12, ET 18, GW 20, PSTN 22, telephone 24, CBS 26, and cellular telephone 28 for ease of illustration. However, any member of CUs 14, 16, satellites 12, ET 18, GW 20, PSTN 22, telephone 24, CBS 26, and cellular telephone 28 can be used in a communication system.

Figure 2:
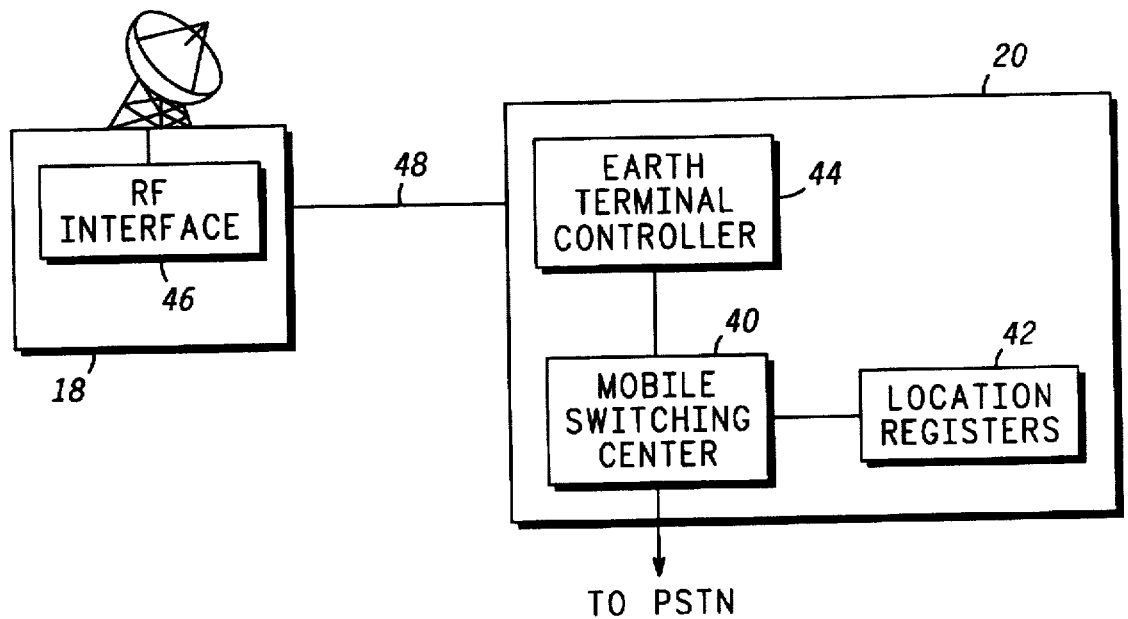
FIG. 2 illustrates an earth terminal and a gateway in accordance with a preferred embodiment of the present invention.

FIG. 2 illustrates GW 20 and ET 18 in accordance with a preferred embodiment of the present invention. GW 20 communicates with ET 18 over link 48. Link 48 can be an RF, optical, or hard-wired link. ET 18 includes RF interface 46, which enables RF communication between satellites (e.g., satellites 12, FIG. 1) and ground-based equipment.

GW 20 is coupled to ET 18 and includes Mobile Switching Center 40 (MSC), location registers 42, and Earth Terminal Controller 44 (ETC). MSC 40 is a point where communications transit between the satellite network and another network (e.g., PSTN 22, FIG. 1). Location registers 42 are coupled to MSC 40. Location registers 42 are typically one or more memory storage devices which contain the last known locations of a number of the CUs supported by the communication system. The CU locations are typically obtained during a location updating procedure as described in conjunction with FIGS. 7–9. ETC 44 controls operations of ET 18 and provides an interface between ET 18 and MSC 40. Basically, ETC 44 provides and manages transmission paths between CUs (e.g., CUs 14, 16, FIG. 1) and MSC 40.

As described previously, an alternate embodiment can utilize a terrestrial-based communication system. In such a system, the apparatus described in FIG. 2 would be different. Specifically, ET 18 and ETC 44 would combine to perform the functions of a BSS, and would provide direct RF communication with CUs.

Figure 3:
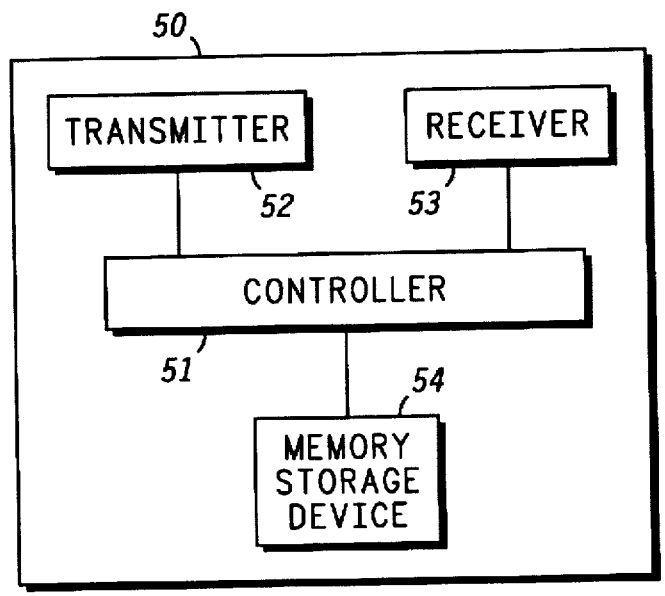
FIG. 3 illustrates a Mobile Switch Interface (MSI) in accordance with a preferred embodiment of the present invention.

FIG. 3 illustrates MSI 50 in accordance with a preferred embodiment of the present invention. MSI 50 includes controller 51, transmitter 52, and receiver 53. In a preferred embodiment, MSI 50 additionally includes memory storage device 54. As described previously, in a satellite-based system, MSI 50 can be a combination of a satellite, ET, and ETC. In a ground-based system, MSI 50 can be a BSS. MSI 50 is shown as one unit in FIG. 3 to clarify the functions performed by MSI 50 as a unit.

Receiver 53 is for receiving messages from a CU and from the MSC. Although only one receiver 53 is shown in FIG. 3, multiple devices are likely to be necessary since the communication interfaces with a CU and an MSC are likely to be different. In a satellite-based system, receiver 53 could be a combination of a satellite and an ET. Messages received by receiver 53 are described in more detail in conjunction with FIGS. 5–9.

Controller 51 is coupled to receiver 53. Controller 51 is for evaluating received messages and for modifying those messages in accordance with the present invention. In a satellite-based system, controller 51 would be an ETC. The functionality of controller 51 is described in more detail in conjunction with FIGS. 8–9.

Transmitter 52 is coupled to controller 51. Transmitter 52 is for sending messages to a CU and to the MSC. Although only one transmitter 52 is shown in FIG. 3, multiple devices are likely to be necessary since the communication interfaces with a CU and an MSC are likely to be different. Messages transmitted by transmitter 52 are described in more detail in conjunction with FIGS. 5–9.

In a preferred embodiment, MSI 50 also includes memory storage device 54 for storing information necessary to carry out a preferred embodiment of the present invention.

Figure 4:
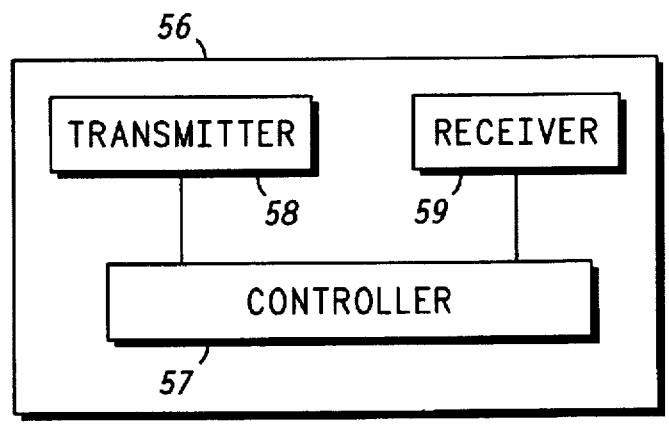
FIG. 4 illustrates a communication unit (CU) in accordance with a preferred embodiment of the present invention.

FIG. 4 illustrates CU 56 (e.g., CUs 14, 28, FIG. 1) in accordance with a preferred embodiment of the present invention. CU 56 includes controller 57, transmitter 58, and receiver 59.

Among other things, controller 57 is for determining whether a user of the CU intends to utilize an additional system service after a location updating process. Transmitter 58 is coupled to controller 57. Transmitter 58 is for sending messages to the MSI. Receiver 59 is also coupled to controller 57. Receiver 59 is for receiving messages from the MSI. The messages sent by transmitter 58 and received by receiver 59 are described in more detail in conjunction with FIGS. 5–9.

Figure 5:
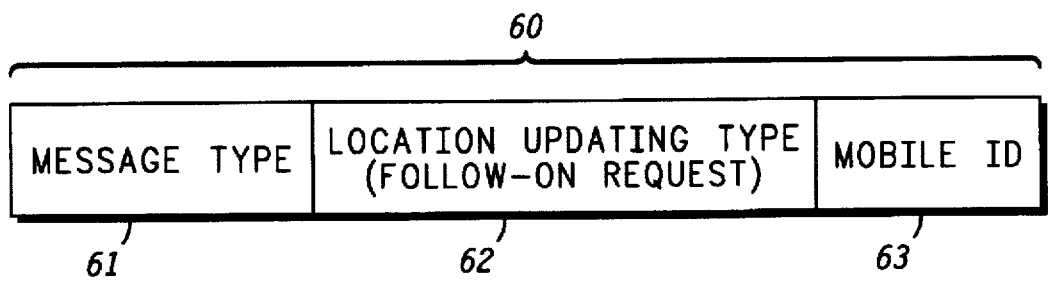
FIG. 5 illustrates a LOCATION UPDATING REQUEST message in accordance with a preferred embodiment of the present invention.

FIG. 5 illustrates LOCATION UPDATING REQUEST message 60 in accordance with a preferred embodiment of the present invention. LOCATION UPDATING REQUEST message 60 is sent from a CU through an ETC to an MSC when the CU needs to register its location with the communication system.

LOCATION UPDATING REQUEST message 60 includes message type field 61, location updating type field 62, and mobile ID field 63. Message type field 61 contains an opcode which identifies the message as a LOCATION UPDATING REQUEST message.

Location updating type field 62 indicates the type of updating to be performed and includes a bit which indicates whether the CU wants to perform a follow-on procedure (i.e., an additional transaction) after the location registration process. Typically, when the follow-on request indicator is set, a follow-on request is pending. When the follow-on request indicator is clear, no follow-on request is pending.

Mobile ID field 63 is used to provide the identity of the CU. The identity can be an International Mobile Subscriber Identity (IMSI), a Temporary Mobile Subscriber Identity (TMSI), or an International Mobile Station Identity (IMEI).

Additional fields are typically provided in a LOCATION UPDATING REQUEST message. However, these fields are not included in FIG. 5 for simplicity of description.

Figure 6:
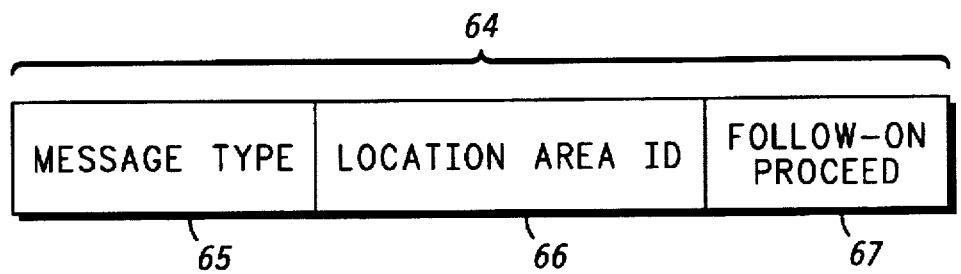
FIG. 6 illustrates a LOCATION UPDATING ACCEPT message in accordance with a preferred embodiment of the present invention.

FIG. 6 illustrates LOCATION UPDATING ACCEPT message 64 in accordance with a preferred embodiment of the present invention. LOCATION UPDATING ACCEPT message 64 is sent from an MSC through an ETC to a CU when authentication is complete.

LOCATION UPDATING ACCEPT message 64 includes message type field 65, location area ID field 66, and Follow On Proceed (FOP) field 67. Message type field 65 contains an opcode which identifies the message as a LOCATION UPDATING ACCEPT message. Location area ID field 66 provides unambiguous identification of the location areas within the area covered by the communication system.

FOP field 67 is used to indicate that a follow-on connection may be established after the registration process. Additional fields are typically provided in a LOCATION UPDATING ACCEPT message. However, these fields are not included in FIG. 6 for simplicity of description.

Figure 7:
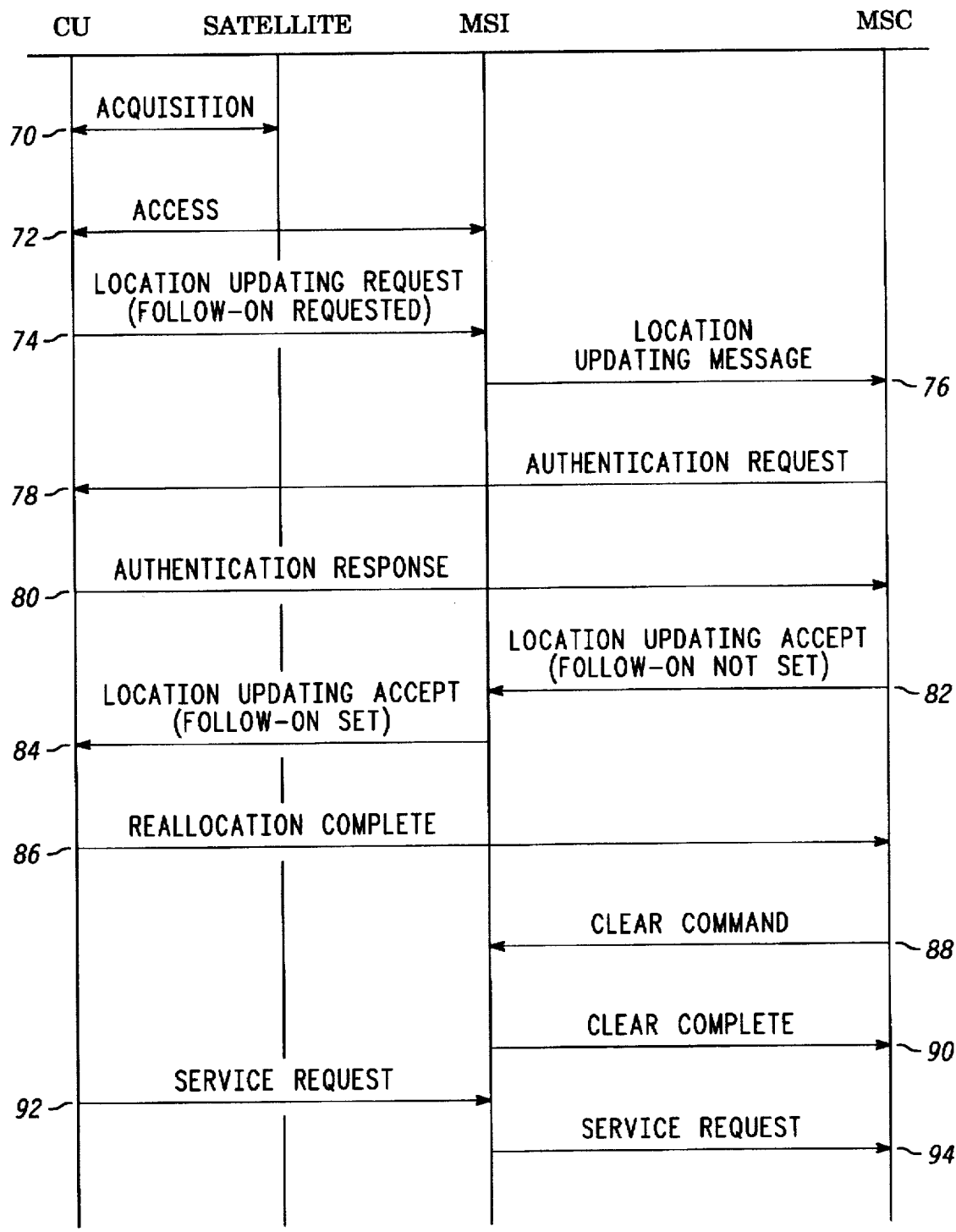
FIG. 7 illustrates a signaling diagram of a switch-independent location registration process in accordance with a preferred embodiment of the present invention.

FIG. 7 illustrates a signaling diagram of a switch-independent location registration process in accordance with a preferred embodiment of the present invention. For a location registration process followed by an additional transaction, the signaling diagram illustrates the sequence of messages transferred between a CU (e.g., CU 14, 16, FIG. 1), an MSI (e.g., satellite 12, ET 18, and ETC 44, FIG. 2) and an MSC (e.g., MSC 40, FIG. 2).

In a preferred embodiment, where the communication system is a satellite-based system, a satellite (e.g., satellite 12, FIG. 1) would exist on the link between the CU and the MSI. A vertical line indicating a satellite is interjected between the CU and the MSI in FIG. 7 for purposes of illustration. Additionally, in a satellite-based system, the MSI would function as an ETC (e.g., ETC 44, FIG. 2). In an alternate embodiment, where the communication system is a terrestrial-based system, no satellite would exist between the CU and the MSI and the MSI would function as a BSS. FIG. 7 is described in terms of a satellite-based communication system.

Acquisition is the first step in obtaining service from the communication system. During acquisition, acquisition messages 70 are exchanged between the CU and a satellite which is servicing the CU. The acquisition process is responsible for establishing a communications link (e.g., link 32, FIG. 1) between a satellite and the CU. One of the main functions of the acquisition process is to establish synchronization between the satellite and the CU.

After the acquisition process, access messages 72 are exchanged between the CU and the MSI (e.g., ETC 44, FIG. 2) which is servicing the CU. Access messages 72 are transmitted between the CU and the MSI through the satellite. The access process allows the communication system to control a CU's access to system services. Access to services is based, in part, on the CU's geographic location.

In a preferred embodiment, the access process consists of two subprocesses: location determination and access approval. Location determination can be accomplished in any of several ways. In a preferred embodiment, the CU and satellite exchange bursts which are used to measure time and frequency offsets relative to the satellite time and frequency standard. The satellite derives the differential time of arrival (DTOA) and differential frequency of arrival (DFOA) measurements. The DTOA and DFOA measurements are used to calculate the CU location. In an alternate embodiment, the CU location can be determined using a geolocation device or some other triangularization process wherein signals are exchanged between the CU and at least two devices whose locations are known.

A CU can be located in areas serviced by different communication service providers. Some service providers could be barred from providing service to a CU. Therefore, an access approval process is performed which correlates the CU location with the service provider areas. If the CU is located in a service provider area where service is barred, then the CU is denied access and forced to release the channel. If the CU is located in a service provider area where service is allowed, the procedure continues.

When necessary, a CU may be required to re-register with the communication system. Registration allows the communication system to track CUs so that a particular CU can be notified when there is an incoming call. Thus, registration is typically necessary when the CU has changed location. CU locations are typically stored in a memory storage device (e.g., location registers 42, FIG. 2) coupled to the MSC.

During access, a determination is made whether registration is necessary. Registration can be automatic or initiated by the user. Automatic registration can occur in several ways. In a preferred embodiment, the CU stores location information of its most recent registration and continuously calculates its current location based on information received from the orbiting satellites. When the calculated location and the last registered location exceed a re-registration distance, the CU will re-register with the communication system without user intervention.

In an alternate embodiment, the communication system can inform the CU that it must re-register when the location determined during the access process 72 indicates that the CU has moved into a different service area or the CU location exceeds a re-registration distance from the last registration location. In other alternate embodiments, the CU can periodically re-register (e.g., once every half hour) or can re-register upon origination or termination of every phone call.

When registration is necessary, after acquisition 70 and access 72, the CU sends a LOCATION UPDATING REQUEST message 74 (e.g., LOCATION UPDATING REQUEST message 60, FIG. 5) to the MSI. Unless the user specifically initiates a registration process, the acquisition 70 and access 72 processes are performed when the CU user attempts to access system services. In such a case, the user wishes to access the system after registration.

Several reasons why the user may want to access the system after registration include a paging response, detach message (e.g., an IMSI detach), and a service request (e.g., a Communication Management (CM) service request). The CU sends a detach message when the CU is switched off or not in a position to receive an answer from the network. To request system services, the CU sends a service request which covers all other reasons for access, including call set-up, short message transmissions, and supplementary service management. These reasons for access are referred to herein as "transactions". At times, the user may wish to perform multiple additional transactions.

To inform the MSI that the user wishes to perform one or more additional transactions after the registration process, the CU sets the follow-on request indicator in the location updating type field 62 (FIG. 5) of the LOCATION UPDATING REQUEST message 74 before sending the message to the MSI.

Once the MSI receives the message, the MSI checks the follow-on request indicator in the location updating type field 62 (FIG. 5). When the follow-on request indicator is set, the MSI marks the CU for follow-on processing. The MSI maintains knowledge that the CU wishes to perform additional transactions throughout the registration process. The MSI then sends a LOCATION UPDATING message 76 to the MSC which indicates that the CU is performing a location registration.

In a preferred embodiment, the MSC then sends an AUTHENTICATION REQUEST message 78 to the CU through the MSI and the satellite. Authentication of the CU is performed for system security reasons and can be accomplished in any of several ways known to those of skill in the art. In a preferred embodiment, for example, a secret parameter called a key (Ki) is stored in both the CU and the MSC. The MSC, during authentication, sends a randomly generated number (RAND) to the CU. The CU runs a cryptographic algorithm using Ki which processes RAND. The algorithm results in an SRES (Signed RESult) which the CU sends back to the MSC. The MSC compares the CU-generated SRES with an SRES generated by the MSC using Ki and RAND. The CU is considered authenticated when the CU-generated SRES and the MSC-generated SRES match. In an alternate embodiment, authentication can be achieved by using a password, or a Personal Identity Number (PIN). However, a low level of protection is achieved by authenticating using a PIN.

The CU responds to the AUTHENTICATION REQUEST message 78 by sending an AUTHENTICATION RESPONSE message 80 to the MSC. The AUTHENTICATION RESPONSE message 80 indicates whether the CU is authenticated or not.

After successful authentication, the MSC sends a LOCATION UPDATING ACCEPT message 82 to the MSI. The LOCATION UPDATING ACCEPT message 82 indicates that location updating has been completed. Where the MSC does not support FOP capabilities, the FOP bit 67, FIG. 6 will not be set. Normally, lack of support of FOP mandates that the CU will be forced to release the channel as soon as the location registration process is completed. However, the method and apparatus of the present invention enables the MSI to override the forced release.

In a preferred embodiment, the MSI has maintained knowledge of whether additional transactions are desired by the CU user. As explained previously, the CU indicates that it desires to perform additional transactions by setting the follow-on request indicator in the LOCATION UPDATING REQUEST message 74. When the MSI receives the LOCATION UPDATING ACCEPT message 82, if follow-on processing was requested, the MSI "flips" the FOP bit 67, FIG. 6, and sends a modified LOCATION UPDATING ACCEPT message 84 to the CU.

The CU then sends the REALLOCATION COMPLETE message 86 to the MSC. The REALLOCATION COMPLETE message 86 is the CU's acknowledgment that the registration process was successfully completed.

As indicated before, the MSC may not support FOP capabilities. If not, the MSC then attempts to force the CU to release the channel. The MSC, thus, sends a CLEAR COMMAND 88 to the MSI. The CLEAR COMMAND 88 is the MSC's instruction to the CU to release the channel.

Ordinarily, the CLEAR COMMAND 88 would be acted upon by the MSI, and a similar message sent from the MSI to the CU. However, according to the method of the present invention, the MSI "intercepts" the CLEAR COMMAND 88 and does not pass it to the CU.

Instead, the MSI tricks the MSC by sending a CLEAR COMPLETE message 90 to the MSC. Normally, the CLEAR COMPLETE message 88 originates from the MSI in response to reception of a similar message sent from the CU to the MSI. However, by the MSI intercepting the CLEAR COMMAND 88 and sending the CLEAR COMPLETE message 90, the CU need not release the channel and can proceed directly to perform the additional desired transactions. Undesirable delays between registration and call origination or termination are avoided.

The CU stiff maintains the channel, and the CU can then send a SERVICE REQUEST message 92 to the MSI without re-acquiring the channel. The SERVICE REQUEST message 94 tells the MSI what additional transaction the CU desires to perform. The MSI forwards the SERVICE REQUEST message 94 to the MSC and the additional transaction can proceed.

Figure 8:
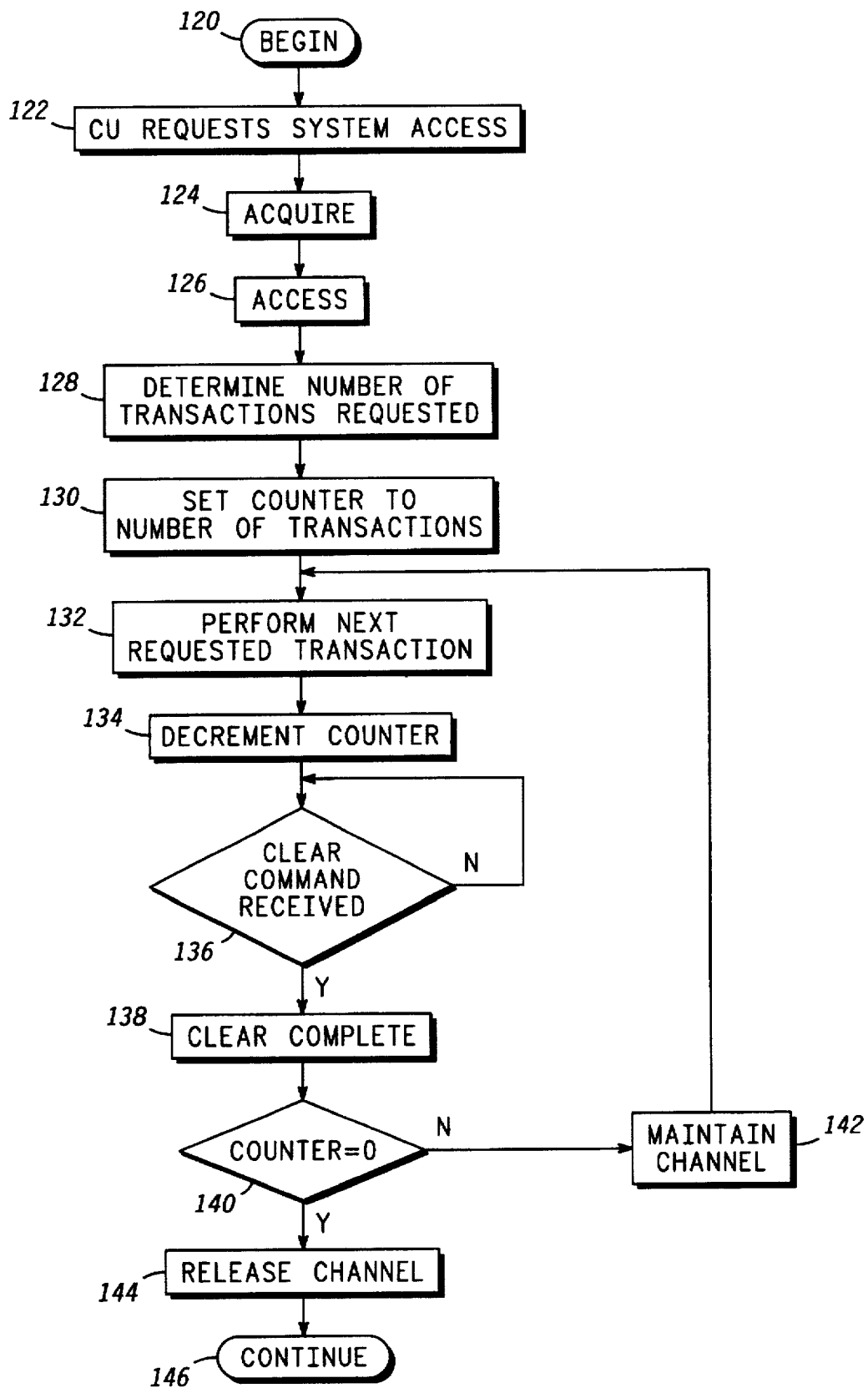
FIG. 8 illustrates a flowchart of a method for call continuation after location registration in accordance with a preferred embodiment of the present invention.
Figure 9:
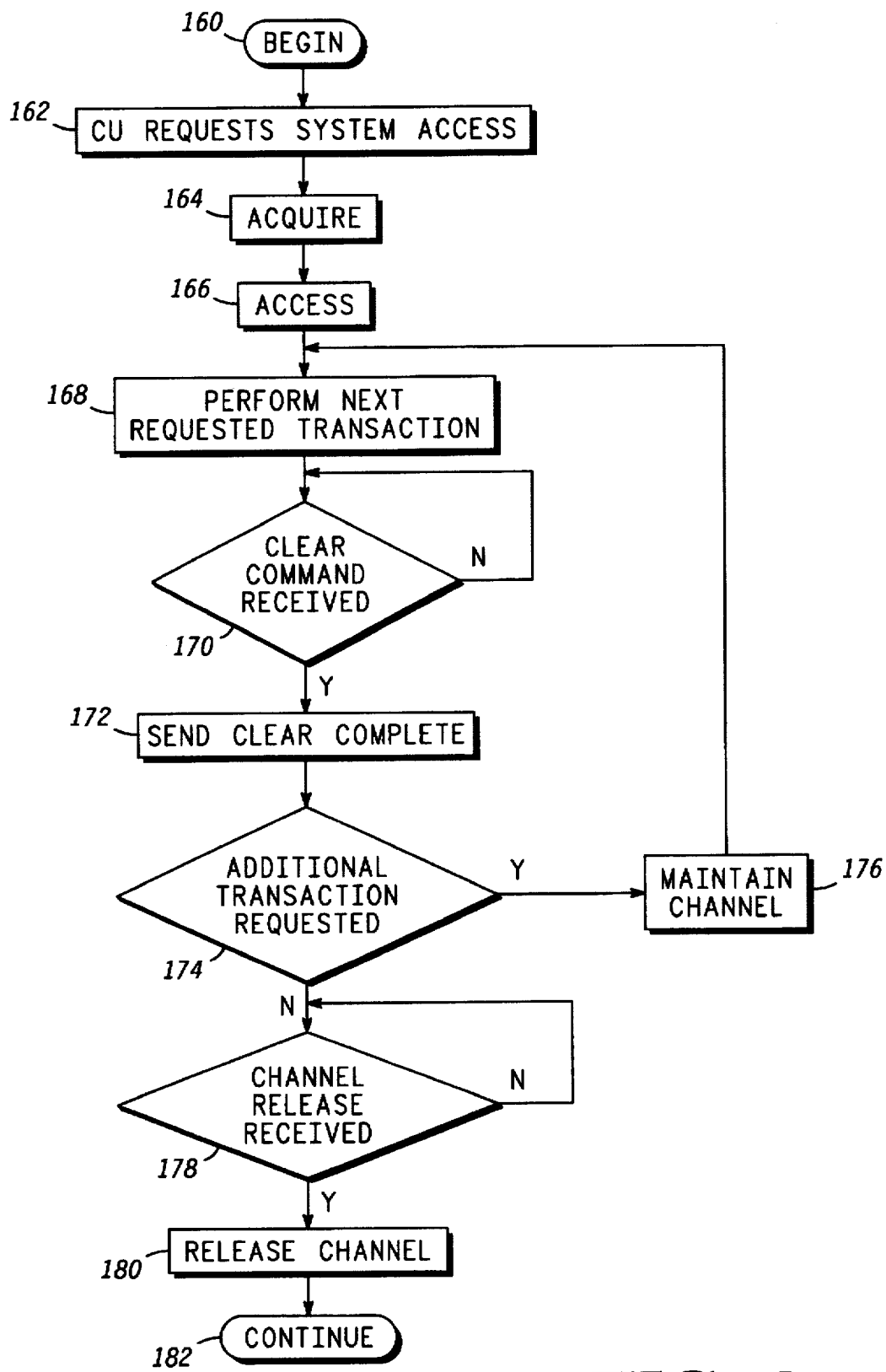
FIG. 9 illustrates a flowchart of a method for call continuation after location registration in accordance with an alternate embodiment of the present invention.

FIGS. 8 and 9 illustrate a preferred and an alternate embodiment, respectively, of carrying out the method of the present invention. The method described in FIG. 8 provides FOP capability in a communication system where the MSC does not support FOP capability (i.e., the MSC does not utilize the FOP bit). The method described in FIG. 9 provides FOP capability regardless of whether the MSC supports FOP capability. In other words, the method described in FIG. 9 can work with both an MSC which utilizes the FOP bit and with an MSC which does not utilize the FOP bit.

FIG. 8 illustrates a flowchart of a method for call continuation after location registration in accordance with a preferred embodiment of the present invention. The method begins 120 when a CU requests system access in step 122. System access can be requested, for example, when a CU user dials a phone number of another CU, telephone, or other communication device.

An acquisition process is then performed in step 124 and an access process is performed in step 126. Acquisition and access processes were described in conjunction with signals 70, 72, FIG. 7. The access process determines whether or not a location registration process is necessary.

At this point, the MSI performs steps 128–142 which enable FOP capabilities to be realized even though an MSC does not support FOP. The MSI determines the number of transactions requested in step 128. In a preferred embodiment, the MSI determines whether multiple transactions have been requested by evaluating the reason for access. When the reason for access is to perform a location registration procedure, the CU determines whether the follow-on request indicator in the location updating type field 62 (FIG. 5) is set in the LOCATION UPDATING REQUEST message 60 (FIG. 5).

If the follow-on request indicator is not set, the MSI knows that a single transaction is to be performed (i.e., a location updating procedure). If the follow-on request indicator is set, the MSI knows that at least two transactions must be performed, the first transaction being a location updating procedure. The second transaction type is determined after the location updating procedure when the CU sends a service request message (e.g., SERVICE REQUEST message 92, FIG. 5).

In a preferred embodiment, the MSI establishes a counter and sets the counter to the number of transactions in step 130. The counter is used to determine when the CU has completed all requested transactions. In alternate embodiments, other ways of determining whether the CU has completed all requested transactions can be used. Which method is used is not crucial to the present invention. After the counter is established, the MSI performs the next requested transaction in the list of transactions in step 132. The counter is decremented in step 134.

In step 136, the MSI determines whether a clear command (e.g., CLEAR COMMAND 88, FIG. 7) has been received from the MSC. If not, the MSI continues to wait. If so, the MSI sends a clear complete message (e.g., CLEAR COMPLETE message 90, FIG. 7) to the MSC in step 138.

The MSI, in step 140, then determines whether the counter is equal to zero, indicating that all requested transactions have been completed by the CU. If not, the MSI maintains the channel in step 142 by not sending a clear command to the CU and the process iterates as shown in FIG. 8. If all requested transactions have been completed by the CU, the MSI informs the CU to release the channel in step 144. The procedure then ends 146.

FIG. 9 illustrates a flowchart of a method for call continuation after location registration in accordance with an alternate embodiment of the present invention. The alternate embodiment illustrated in FIG. 9 enables an MSI to have FOP capabilities independently of whether the MSC utilizes the FOP bit. In other words, the method depicted in FIG. 9 operates independent of the FOP bit, but achieves the same result as if the FOP bit were utilized.

The method begins 160 when a CU requests system access in step 162. An acquisition process is then performed in step 164 and an access process is performed in step 166. Acquisition and access processes were described in conjunction with signals 70, 72, FIG. 7. The access process determines whether or not a location registration process is necessary.

Next, the MSI enters a loop in which the first step 168 is to perform a fast transaction requested by the CU. Where only a single transaction has been requested (e.g., a location updating procedure), step 168 performs that transaction. Where multiple transactions have been requested (e.g., a location updating procedure followed by a call set-up), step 168 performs the first transaction in a sequential list of requested transactions.

In step 170, the MSI determines whether a clear command (e.g., CLEAR COMMAND 88, FIG. 7) has been received from the MSC. If not, the MSI continues to wait. If so, the MSI sends a clear complete message (e.g., CLEAR COMPLETE message 90, FIG. 7) to the MSC in step 172.

The MSI then determines, in step 174, whether the CU has requested one or more additional transactions. The CU could request one or more additional transactions before or during the programming loop defined by steps 168–176. Each additional transaction is desirably stored in the sequential list of requested transactions. When the CU has requested at least one additional transaction, the MSI maintains the channel in step 176 by not sending a clear command to the CU and the process iterates as shown in FIG. 9.

When the CU has not requested additional transactions, the MSI determines, in step 178, whether a channel release has been received from the CU. If no channel release has been received, the MSI continues to wait. If a channel release has been received, the MSI informs the CU to release the channel in step 180. The procedure then ends 182.

Note that the order of execution of the steps of FIGS. 8 and 9 can be altered without departing from the spirit of the method of the present invention. For example, in FIG. 8, the decrement counter step 134 can be performed anywhere within the sequence of steps 132–138. Such alterations of step order are intended to be encompassed within the scope of the method and apparatus of the present invention.

In summary, the method and apparatus of the present invention enable a communication system to provide FOP capability independent of whether the MSC supports FOP processing. In a preferred embodiment, FOP capability is achieved because the MSI maintains the channel when the follow-on request indicator is set in the LOCATION UPDATING REQUEST message sent by the CU. In an alternate embodiment, FOP capability is achieved because the MSI maintains the channel when additional transactions have been requested by the CU beyond a location updating process, and the CU has not completed all requested transactions.

By maintaining the channel after the location updating procedure when the user wishes to perform additional transactions, the method and apparatus of the present invention overcome the problem of a potentially annoying channel release which can result when the MSC does not support FOP capabilities.

What is claimed is:

1. A method for location registration and call continuation for a communication unit (CU) in a communication system having a Mobile-Switch Interface (MSI) coupled to a Mobile services Switching Center (MSC), wherein the MSI provides an interface between the CU and the MSC, and the MSC interfaces the communication system with another communication system, the method comprising the steps of:

a) evaluating, by the MSI, whether the CU must perform a location updating process after the CU has initiated access to the communication system, wherein the location updating process is performed so that the communication system has a knowledge of a location of the CU;

b) when the location updating process must be performed, the MSI assisting in performing the location updating process;

c) determining, by the MSI, whether the CU has requested to use a system service after the location updating process is completed;

d) when the CU has requested to use the system service after the location updating process is completed, the MSI allowing the CU to use the system service cycle if the MSC has informed the MSI that the CU cannot perform the additional system service, and the MSI repeating the determining step to determine whether the CU intends to use another system service; and e) when the CU has not requested to use the system service after the location updating process is completed, the MSI forcing the CU to release a channel between the CU and the MSC.

2. The method as claimed in claim 1, wherein the step of evaluating comprises the steps of:

a1) calculating a current location of the CU;

a2) comparing the current location with a last registered location; and a3) when the comparing step indicates that the current location exceeds a re-registration distance from the last registered location, determining that the location registration process must be performed.

3. The method as claimed in claim 2, wherein the step of calculating the current location comprises the steps of:

a1a) exchanging bursts between the MSI and the CU to measure a time offset and a frequency offset;

a1b) deriving a differential time of arrival (DTOA) and a differential frequency of arrival (DFOA) from the time offset and the frequency offset; and a1c) using the DTOA and the DFOA to calculate the current location.

4. The method as claimed in claim 2, wherein the step of calculating the current location comprises the steps of:

a1a) exchanging signals between the CU and at least two devices whose locations are known; and a1b) performing a triangularization process between the CU and the at least two devices to determine the current location.

5. The method as claimed in claim 1, wherein the step of evaluating comprises the steps of:

a1) determining whether a re-registration period of time has elapsed from a last location registration of the CU; and a2) when the re-registration period of time has elapsed, determining that the location updating process must be performed.

6. The method as claimed in claim 1, wherein the step of assisting in performing the location updating process comprises the steps of:

b1) receiving, by the MSI, a LOCATION UPDATING REQUEST message from the CU which notifies the MSI that the CU is performing the location updating process;

b2) sending, by The MSI, a LOCATION UPDATING message to the MSC in response to the LOCATION UPDATING REQUEST message, wherein the LOCATION UPDATING message indicates that the CU is performing the location updating process;

b3) receiving, by the MSI, a LOCATION UPDATING ACCEPT message from the MSC when the location updating process has been successfully completed; and b4) sending, by the MSI, a second LOCATION UPDATING ACCEPT message to the CU.

7. The method as claimed in claim 6, wherein the LOCATION UPDATING REQUEST message includes a Follow-On Proceed (FOP) indicator which is used to indicate whether the CU has requested to use the system service after the location registration process is completed, the method further comprising the step, performed before the step of receiving the LOCATION UPDATING REQUEST message, of:

b5) setting the FOP indicator, by the CU, when the CU is requesting to use the system service after the location registration process.

8. The method as claimed in claim 7, further comprising the steps of:

b6) evaluating, by the MSI, the FOP indicator in the LOCATION UPDATING REQUEST message to determine whether the CU has requested to use the system service after the location registration process; and b7) when the FOP indicator indicates that the CU has requested to use the system service after the location registration process, marking the CU for follow-on processing.

9. The method as claimed in claim 8, wherein the LOCATION UPDATING ACCEPT message includes a FOP bit which indicates that the CU is allowed to use the system service, the method further comprising the steps, performed before the step of sending the second LOCATION UPDATING ACCEPT message to the CU, of:

b8) evaluating, by the MSI, whether the CU was marked for the follow-on processing in the marking step; and b9) when the CU was marked for the follow-on processing in the marking step, the MSI setting the FOP bit of the second LOCATION UPDATING ACCEPT message so that the FOP bit indicates that the CU is allowed to use the system service.

10. The method as claimed in claim 7, further comprising the steps of:

b6) evaluating, by the MSI, the FOP indicator in the LOCATION UPDATING REQUEST message to determine whether the CU has requested to use the system service after the location registration process;

b7) establishing a counter which indicates a number of system services which the CU has requested to use but has not yet used;

wherein the step of determining comprises the steps of:

c1) reading the counter to determine whether the number of system services which the CU has requested to use indicates that at least one of the system services has not yet been performed;

c2) when the counter indicates that the at least one of the system services has not yet been performed, determining that the CU has requested to use the system service;

wherein the step of allowing comprises the step of:

d1) decrementing the counter; and d2) not forcing the CU to release the channel when the counter indicates that the at least one of the system services has not yet been performed.

11. The method as claimed in claim 1, further comprising the step, performed before the allowing step, of:

f) receiving, by the MSI, a CLEAR COMMAND from the MSC which indicates that the MSC wants the CU to release the channel; and wherein the step of allowing comprises the step of:

d1) not sending a second CLEAR COMMAND message to the CU by the MSI so that the CU is not forced to release the channel.

12. The method as claimed in claim 11, wherein the step of forcing the CU to release the channel comprises the step of:

e1) sending the second CLEAR COMMAND message to the CU.

13. A method for location registration and call continuation for a communication unit (CU) in a communication system having a Mobile-Switch Interface (MSI) coupled to a Mobile services Switching Center (MSC), wherein the MSI provides an interface between the CU and the MSC, and the MSC interfaces the communication system with another communication system, the method performed by the MSI comprising the steps of:

a) receiving, by the MSI, a first message from the CU which notifies the MSI that the CU is performing a location updating process;

b) sending, by the MSI, a second message to the MSC in response to the first message, wherein the second message indicates that the CU is performing the location updating process;

c) receiving, by the MSI, a third message from the MSC in response to the second message, the third message indicating that the location updating process has been completed;

d) sending, by the MSI, a fourth message to the CU in response to the third message, wherein the fourth message indicates that the location updating process has been completed;

e) determining, by the MSI, whether the CU has requested to use an additional system service;

f) when the determining step indicates that the CU has not requested to use the additional system service, sending a fifth message to the CU which forces the CU to release a channel between the CU and the MSC; and g) when the determining step indicates that the CU has requested to use the additional system service, not sending the fifth message to the CU which would force the CU to release the channel even when the MSC has informed the MSI that the CU cannot, perform the additional system service.

14. The method as claimed in claim 13, wherein the first message includes a first indicator that the CU has requested to use the additional system service after the location updating process, and the step of determining comprises the step of:

e1) evaluating the first indicator in the first message to determine whether the CU has requested to use the additional system service.

15. The method as dad in claim 14, wherein the third message has a second indicator whose purpose is to instruct the CU whether the CU can use the additional system service, and when the step of determining indicates that the CU has requested to use the additional system service, the step of sending the fourth message comprises the step of:

d1) ensuring, prior to sending the fourth message, that the second indicator informs the CU that the CU can use the additional system service.

16. The method as claimed in claim 13, wherein the step of determining comprises the step of:

e1) determining whether the CU has sent a sixth message to the MSI which indicates that the CU has requested to use the additional system service.

17. A method for location registration and call continuation for a communication unit (CU) in a communication system having a Mobile-Switch Interface (MSI) coupled to a Mobile services Switching Center (MSC), wherein the MSI provides art interface between the CU and the MSC, and the MSC interfaces the communication system with another communication system, the method performed by the CU comprising the steps of:

a) sending a first message which informs the MSI that the CU is performing a location updating process, and which also includes a first indicator which indicates that the CU has requested to use an additional system service after the location updating process;

b) receiving a second message from the MSI in response to the first message, wherein the second message includes a second indicator which indicates that the CU can use the additional system service, and wherein the MSI has ensured that the second indicator indicates that the CU can perform the additional system service even when the MSC has informed the MSI that the CU cannot perform the additional system service; and c) using the additional system service after the location updating process.

18. A Mobile Switch interface (MSI) apparatus for use in a communication system having a Communication Unit (CU), the MSI apparatus, and a Mobile Switching Center (MSC), wherein the MSI apparatus provides an interface between the CU and the MSC, and the MSC enables the communication system to communicate with another communication system, the MSI apparatus comprising:

at least one receiver for receiving a first message from the CU, wherein the first message indicates that the CU is performing a location updating process, the at least one receiver also for receiving a second message from the MSC, the second message indicating whether the MSC allow the CU to utilize an additional system service after the location updating process is completed;

a controller coupled to the at least one receiver for determining whether the CU has requested to utilize the additional system service after the location updating process, wherein when the CU has not requested to utilize the additional system service, the controller for forcing the CU to release a channel between the CU and the MSI, and when the CU has requested to utilize the additional system service; not forcing the CU to release the channel; and at least one transmitter coupled to the controller for sending a third message to the MSC in response to the first message, the third message for informing the MSC that the CU is performing the location updating process, the at least one transmitter also for sending a fourth message to the CU in response to the second message, the fourth message for informing the CU whether the CU may utilize the additional system service, wherein when the second message indicated that the CU has requested to utilize the additional system service, the fourth message will inform the CU that the CU can utilize the additional system service even if the second message indicates that the MSC will not to allow the CU to utilize the additional system service.

19. The MSI apparatus as claimed in claim 18, wherein the first message includes a first indicator which indicates whether the CU has requested to utilize the additional system service, the MSI apparatus farther comprising:

a memory storage device coupled to the controller for storing the first indicator of whether the CU has requested to utilize the additional system service; and the controller further for evaluating the first indicator stored in the memory storage device to determine whether the CU has requested to utilize the additional system service.

20. A Communication Unit (CU) apparatus for use in a communication system having the CU apparatus, a Mobile Switch Interface (MSI), and a Mobile Switching Center (MSC), wherein the MSI provides an interface between the CU apparatus and the MSC, and the MSC enables the communication system to communicate with another communication system, the CU apparatus comprising;

a controller for determining whether a user of the CU apparatus has requested to utilize an additional system service after a location updating process;

a transmitter coupled to the controller, the transmitter for sending a first message to the MSI, wherein the first message includes a first indicator that the CU apparatus has requested to utilize the additional system service; and a receiver coupled to the controller, the receiver for receiving a second message from the MSI in response to the first message, wherein the second message includes a second indicator which indicates that the CU apparatus can perform the additional system service, and wherein the MSI has ensured that The second indicator indicates that the CU apparatus can perform the additional system service even when the MSC has informed the MSI that the CU apparatus cannot perform the additional system service.

* * * * *

UNITED STATES PATENT AND TRADEMARK OFFICE
CERTIFICATE OF CORRECTION

PATENT NO. : 5,710,805
DATED : January 20, 1998
INVENTOR(S) : ARMBRUSTER, Peter Joseph et al.

It is certified that error appears in the above-identified patent and that said Letters Patent is hereby corrected as shown below:

In column 13, claim 15, line 1, delete "dad" and replace with "claimed".

In column 14, claim 17, line 5, delete "art".

Signed and Sealed this

Twenty-second Day of September, 1998

Attest:

BRUCE LEHMAN

*Attesting Officer*   *Commissioner of Patents and Trademarks*